(12) United States Patent
Obry et al.

(10) Patent No.: US 11,760,210 B2
(45) Date of Patent: Sep. 19, 2023

(54) MODULATED ACTIVE SHORT CIRCUIT BRAKING

(71) Applicant: DANA TM4 INC., Boucherville (CA)

(72) Inventors: Charles Obry, Montreal (CA); Maalainine El Yacoubi, Sainte Julie (CA)

(73) Assignee: DANA TM4 INC., Boucherville (CA)

( * ) Notice: Subject to any disclaimer, the term of this patent is extended or adjusted under 35 U.S.C. 154(b) by 180 days.

(21) Appl. No.: 17/199,974

(22) Filed: Mar. 12, 2021

(65) Prior Publication Data
US 2022/0289042 A1    Sep. 15, 2022

(51) Int. Cl.
| H02P 3/22 | (2006.01) |
| H02P 27/08 | (2006.01) |
| B60L 15/20 | (2006.01) |
| B60L 3/00 | (2019.01) |
| B60L 7/00 | (2006.01) |

(52) U.S. Cl.
CPC .......... *B60L 15/2009* (2013.01); *B60L 3/003* (2013.01); *B60L 3/0046* (2013.01); *B60L 3/0061* (2013.01); *B60L 3/0092* (2013.01); *B60L 7/003* (2013.01); *H02P 3/22* (2013.01); *H02P 27/08* (2013.01)

(58) Field of Classification Search
USPC ....................................................... 318/376
See application file for complete search history.

(56) References Cited

U.S. PATENT DOCUMENTS

| 6,788,014 B2 | 9/2004 | Kissich et al. |
| 7,075,257 B2 | 7/2006 | Carrier et al. |
| 7,372,227 B2 | 5/2008 | Rainer et al. |
| 8,400,740 B2 | 3/2013 | Schumacher et al. |
| 8,441,219 B2 | 5/2013 | Li et al. |
| 8,547,071 B2 | 10/2013 | Horihata et al. |
| 9,806,649 B2 | 10/2017 | Lopez De Arroyabe |
| 2005/0007049 A1 | 1/2005 | Kim |
| 2008/0231219 A1* | 9/2008 | Mori ......................... H02P 3/22 318/434 |
| 2014/0001987 A1 | 1/2014 | Okada |
| 2015/0214858 A1* | 7/2015 | Raichle ..................... B60L 3/04 363/131 |

FOREIGN PATENT DOCUMENTS

| CN | 101277089 A | * | 10/2008 | .......... H02P 23/0004 |
| CN | 102310784 A | * | 1/2012 | ................ B60L 3/04 |

(Continued)

*Primary Examiner* — Jorge L Carrasquillo
(74) *Attorney, Agent, or Firm* — McCoy Russell LLP

(57) ABSTRACT

Methods and systems are provided for modulating undesired electric-motor braking. Based upon the detection of an inverter degradation event, one of a first gate driver and a second gate driver (e.g., a high gate driver and a low gate driver, such as for one phase of an inverter) may be asserted in an alternating manner while the other of the first gate driver and a second gate driver is de-asserted, and the first gate driver and second gate driver may then be provided to a power switch circuitry. The alternating assertion of the one of the first gate driver and the second gate driver may be associated with a higher-speed state, and the de-assertion of both the first gate driver and the second gate driver may be associated with a lower-speed state.

20 Claims, 7 Drawing Sheets

(56) References Cited

FOREIGN PATENT DOCUMENTS

| | | | |
|---|---|---|---|
| CN | 105514941 A | 4/2016 | |
| EP | 0742637 A1 | 11/1996 | |
| EP | 1839929 A2 | 10/2007 | |
| EP | 2741415 A1 | 6/2014 | |
| WO | 0191265 A2 | 11/2001 | |
| WO | WO-2016076429 A1 * | 5/2016 | ............. B60L 3/003 |
| WO | WO-2017186436 A1 * | 11/2017 | ........... H02H 7/0838 |

* cited by examiner

MODULATED ACTIVE SHORT CIRCUIT BRAKING

TECHNICAL FIELD

The disclosure relates to safe control of electric motors when the inverter is not able to correctly control current in the motor.

BACKGROUND

Electric motors are increasingly popular in vehicles such as cars, trucks, and motorcycles. Electric motors may supply torque to various wheels of a vehicle. From time to time, such motors may be commanded or controlled to supply a torque corresponding with a braking process to the wheels, in order to accommodate a braking of the vehicle.

When a fault occurs in an electric motor or in an inverter controlling the motor, the motor may become uncontrollable and may result in an unwanted braking torque. In order to transition the electric motor to a safe state, an Active Short Circuit (ASC) process may be performed while at relatively high speeds, or a freewheeling process may be performed while at relatively low speeds.

SUMMARY

The inventors herein have recognized potential issues with transitioning electric motors to safe states upon the occurrence of a fault. A transition to a safe state may depend upon the integrity of, for example, a Digital Signal Processor (DSP), a microcontroller, and/or other electronic circuits of an associated inverter module (such as an inverter module supplying a three-phase electric voltage to an armature of the vehicle's electric motor). Similarly, a transition to a safe state may depend upon the availability of an auxiliary battery. If an inverter has degraded, or if an auxiliary battery voltage is lost, reading a speed of the electric motor and performing the corresponding transition to the appropriate safe state (e.g., ASC or freewheeling) may no longer be possible. Accordingly, a "safe state" operation of the electric motor and/or vehicle might not be achieved.

Moreover, performing either an ASC process at a relatively low speed or a freewheeling process at a relatively high speed (which might be done if performing either process "blindly," without respect to an actual, measured speed) may result in an excessively high or unacceptably high braking torque. A high back-electromagnetic-field may also present a danger of damaging a power transistor. As a result, mere application of an ASC process or a freewheeling process without regard to the actual speed of the electric motor and/or vehicle may yield unacceptable design performance. In addition, circuitry to attempt readings of the speed of the electric motor that are both reliable and cost-effective may not be able to discriminate as to when to apply an ASC process or a freewheeling process.

The methods and systems disclosed herein address these shortcomings and challenges by supporting a Modulated Active Short Circuit (MASC) approach that alternates between an ASC process and a freewheeling process, for example at a predetermined frequency and/or predetermined duty cycle. The resultant braking torque may then be a weighted average of a torque generated by the ASC process and a torque of the freewheeling process.

In some embodiments, the issues described above may be addressed by methods including, upon an inverter degradation event, asserting one of a high gate driver (or upper gate driver) and a low gate driver (or lower gate driver) to a power switch circuitry in an alternating manner, while de-asserting the other gate driver. (The power switch circuitry may be, e.g., an insulated gate bipolar transistor (IGBT) based power switch circuitry, or a metal-oxide semiconductor field effect transistor (MOSFET) based power switch circuitry, or any other power switch circuitry.) The alternating assertion of one gate driver in combination with the de-assertion of the other gate driver may advantageously result in a braking torque that is a weighted average of a torque associated with an ASC process and a torque associated with a freewheeling process. In various embodiments, the high gate driver may be a first gate driver, and the low gate driver may be a second gate driver.

For some embodiments, the issues described above may be addressed by methods of modulating electric-motor braking including asserting a first gate driver to a power switch circuitry (e.g., either a high gate driver or a low gate driver) in a toggling manner, while de-asserting a second gate driver to the power switch circuitry (e.g., the other gate driver out of the high gate driver and the low gate driver), based on the detection of the degradation event for the inverter. The toggling assertions may then advantageously generate a braking torque that is a weighted average of a torque associated with an ASC process and a torque associated with a freewheeling process.

In some embodiments, an inverter system for electric motors may comprise a motor control unit (MCU) circuitry, a power switch circuitry, and a selection circuitry, and the selection circuitry may select between passing, to the power switch circuitry, either outputs of the MCU circuitry (in a first mode) or an alternatingly-asserted indicator and a deasserted indicator (in a second mode). In the second mode, the indicators may advantageously generate a braking torque that is a weighted average of a torque of an ASC process and a torque of a freewheeling process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1A:
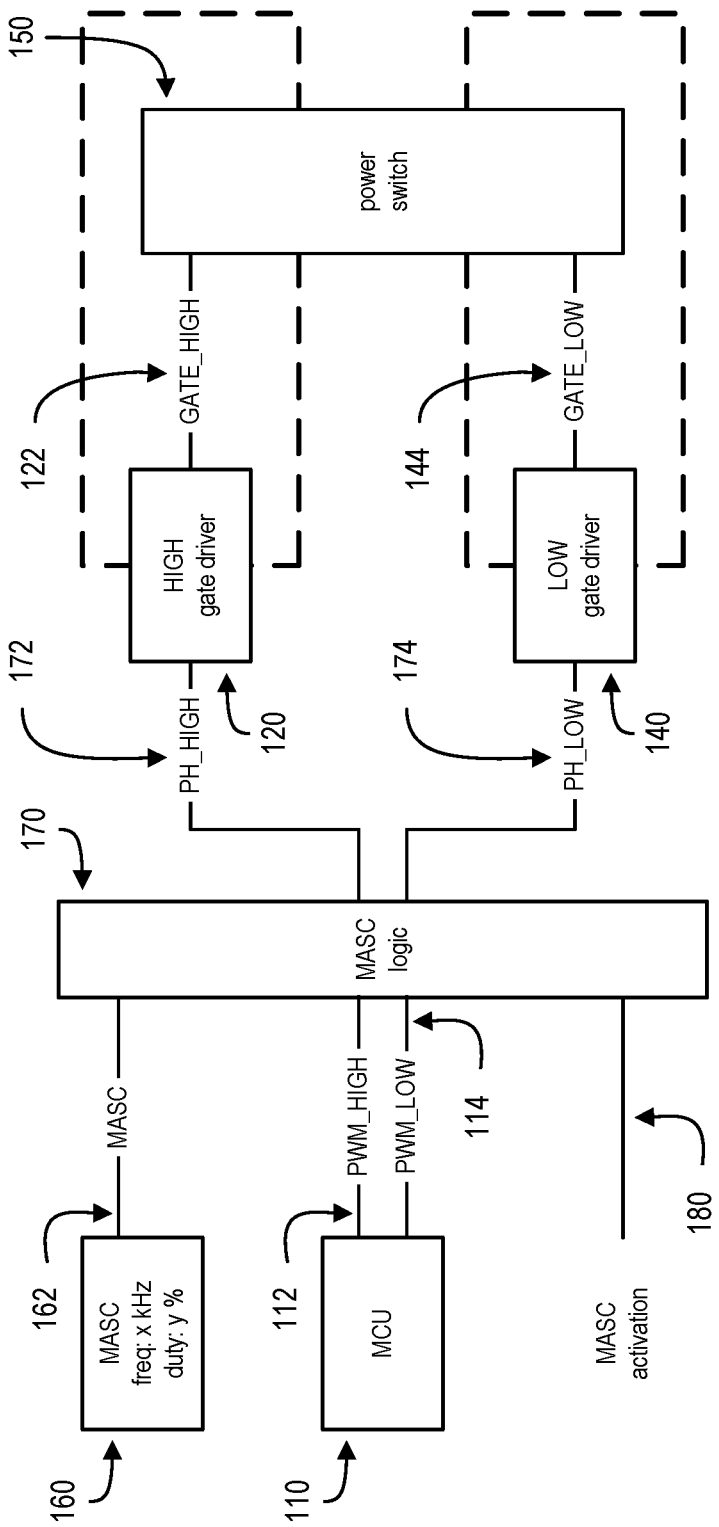
FIG. 1A shows a block diagram of portions of an inverter system circuitry for electric motors associated with one phase, including portions of an inverter circuitry and a Modulated Active Short Circuit (MASC) circuitry, in accordance with one or more embodiments of the present disclosure.
Figure 1B:
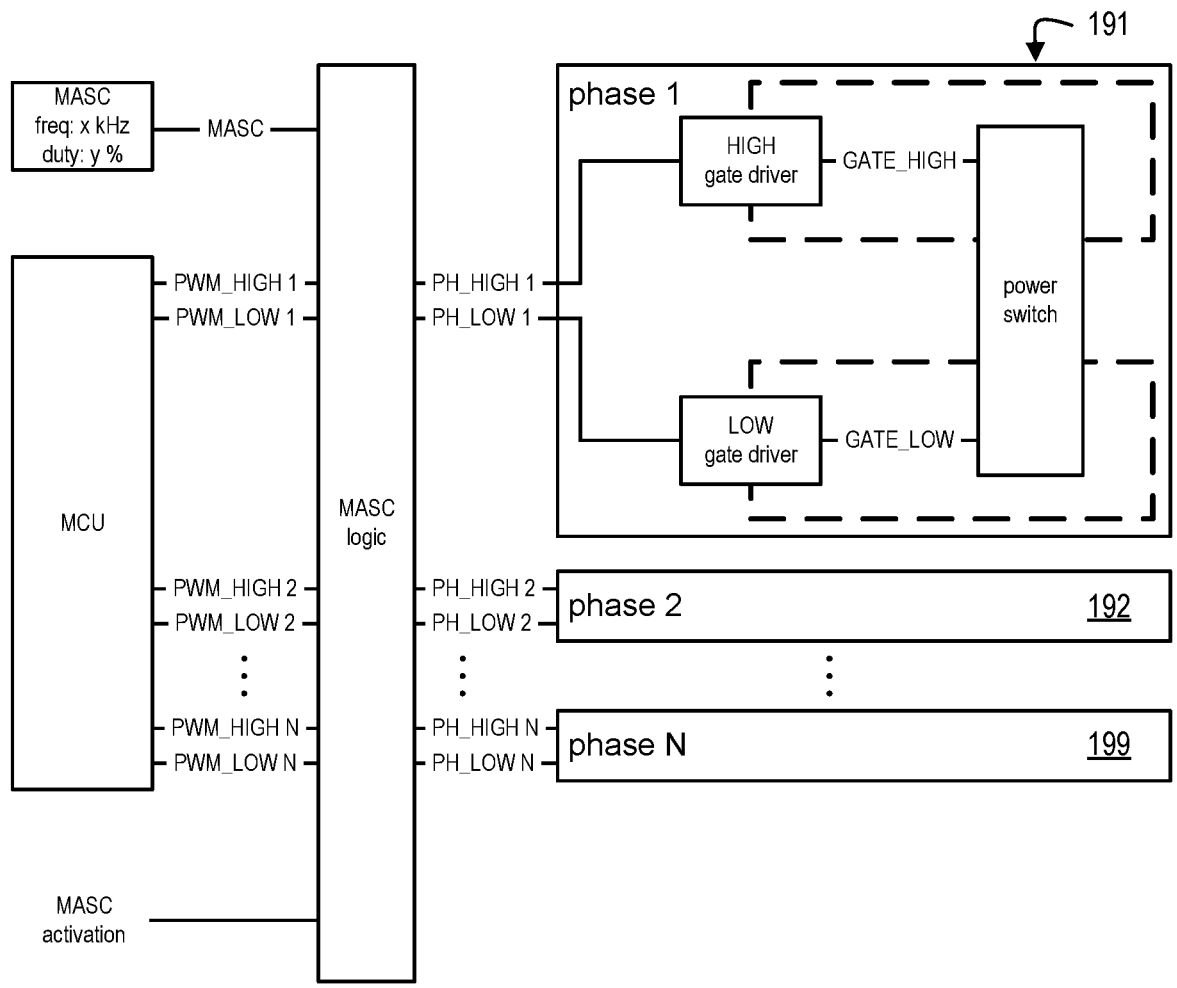
FIG. 1B shows a block diagram of portions of an inverter system circuitry for electric motors associated with multiple phases, including portions of an inverter circuitry and a Modulated Active Short Circuit (MASC) circuitry, in accordance with one or more embodiments of the present disclosure.
Figure 2:
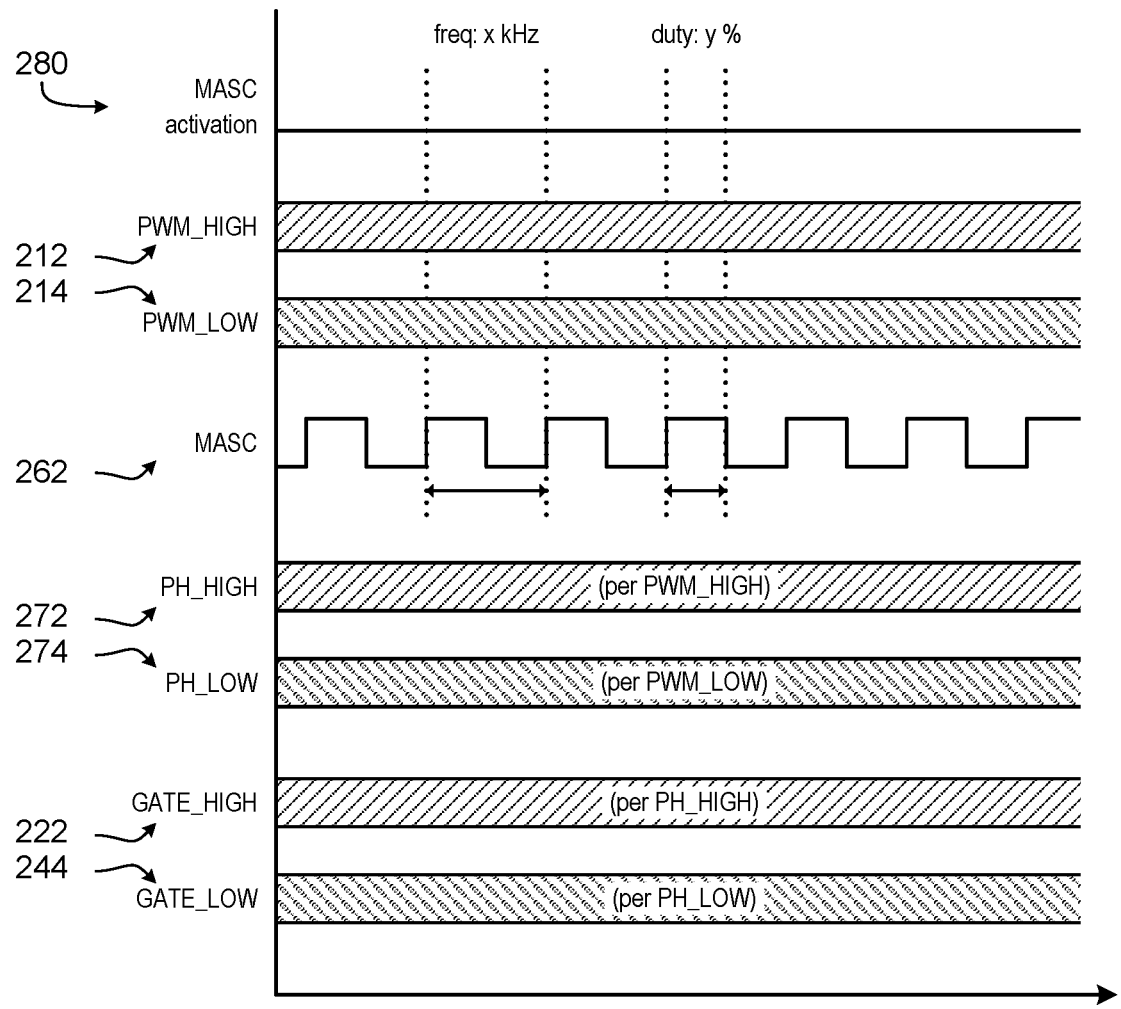
FIGS. 2-4 show timing diagrams of the operation of an inverter system circuitry for electric motors, in accordance with one or more embodiments of the present disclosure.
Figure 3:
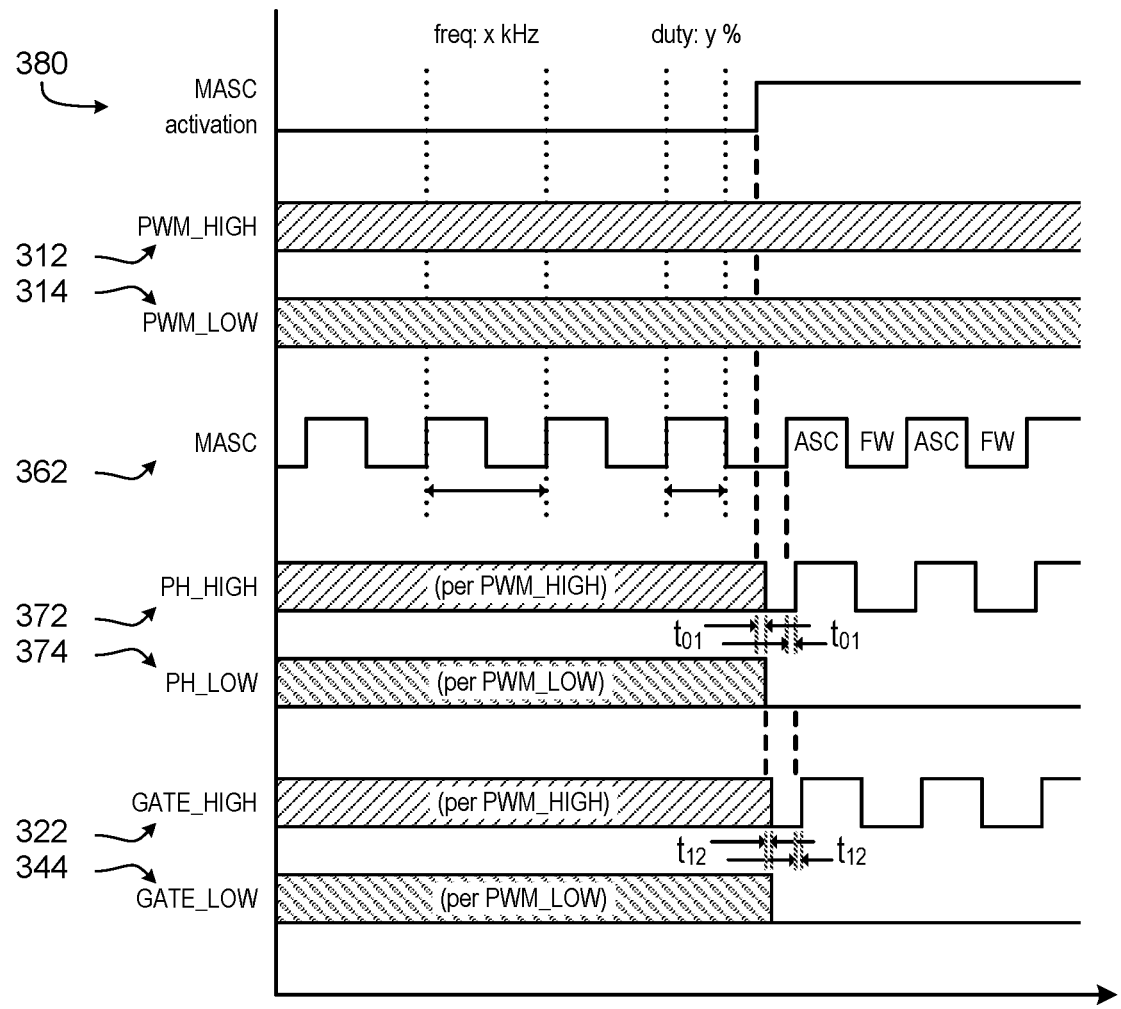
Figure 4:
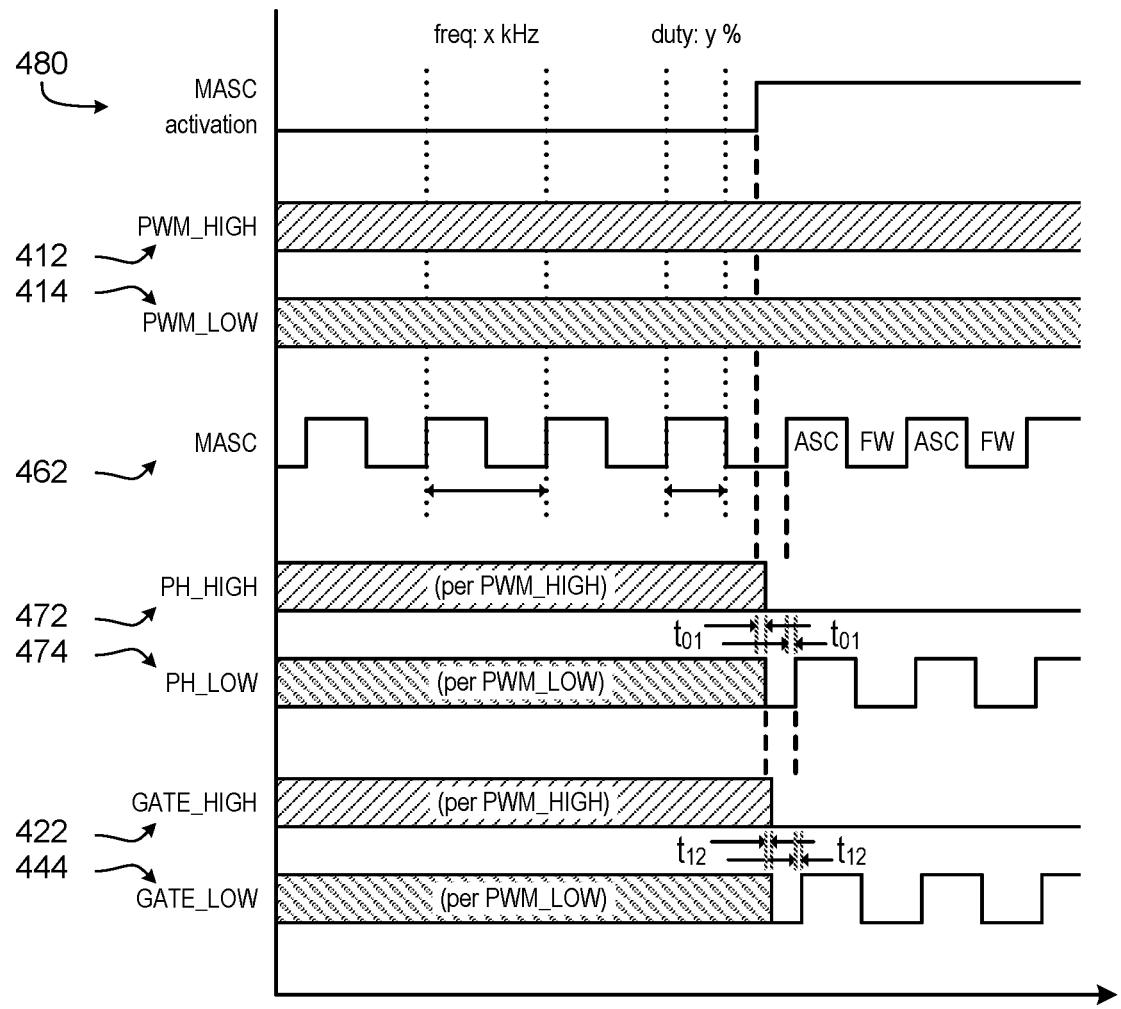
Figure 5:
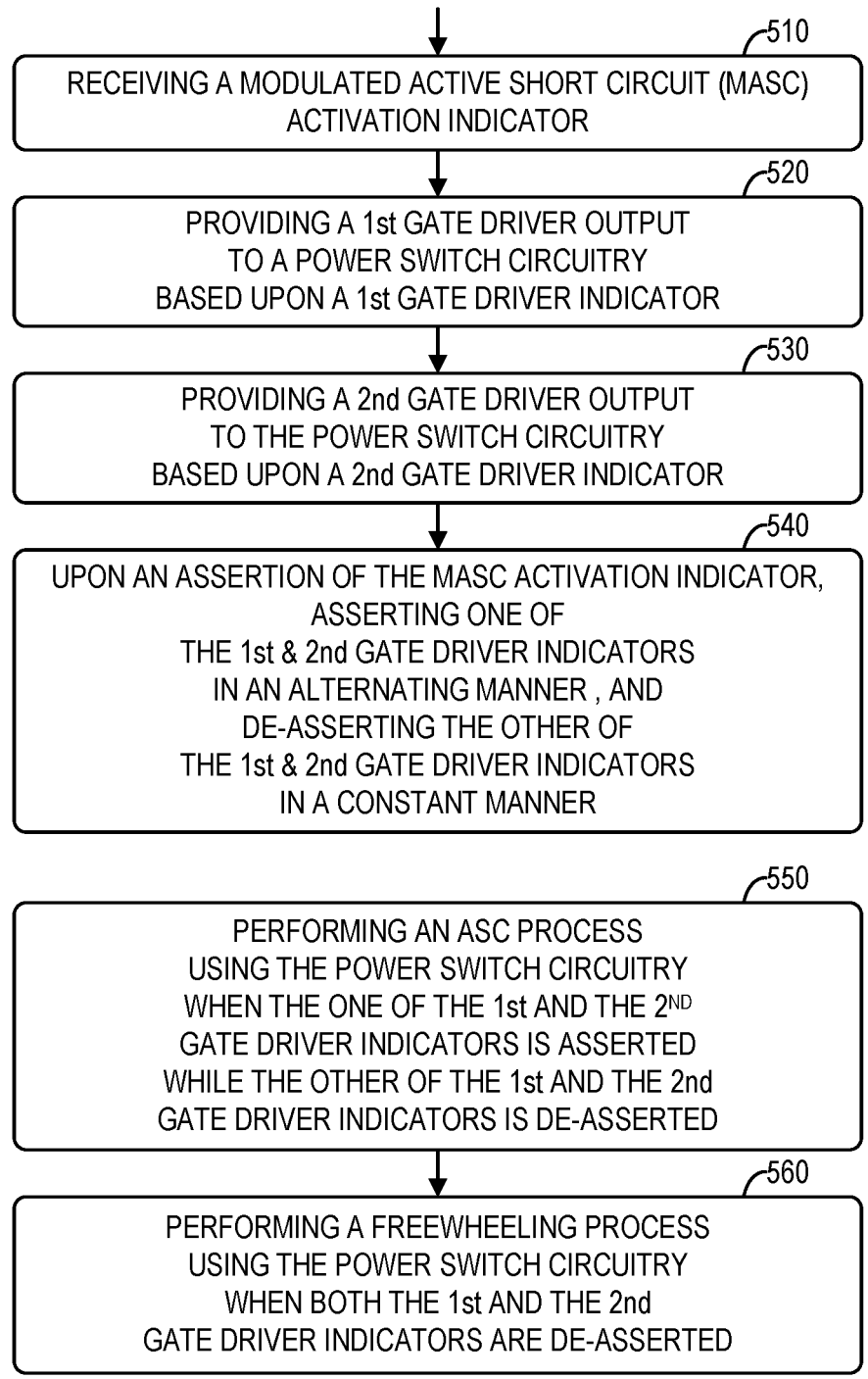
FIG. 5 shows a flow chart of a method for asserting a first gate driver and a second gate driver in accordance with one or more embodiments of the present disclosure.
Figure 6:
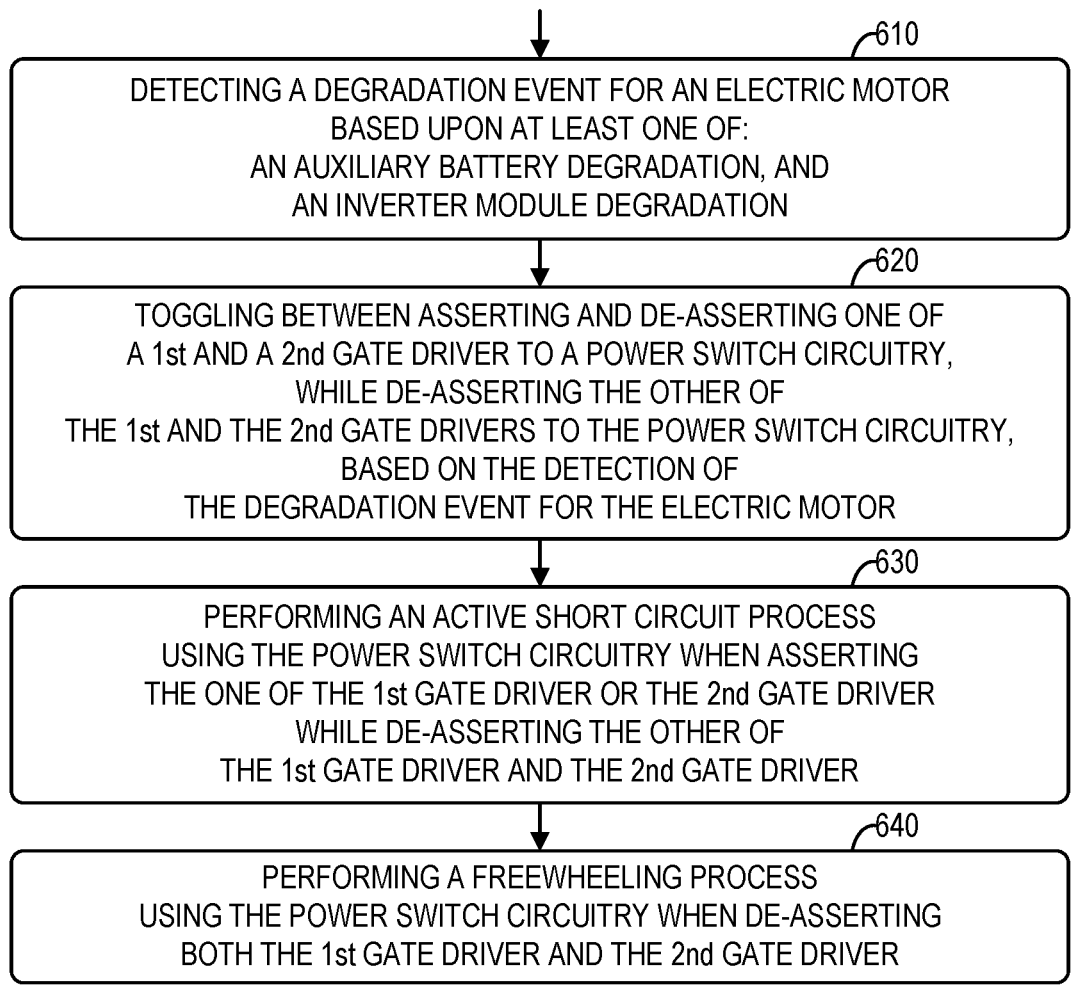
FIG. 6 shows a flow chart of a method of modulating electric-motor braking in accordance with one or more embodiments of the present disclosure.

Disclosed herein are systems and methods for enabling Modulated Active Short Circuit (MASC) for electric motors. FIGS. 1A and 1B depict portions of an inverter system circuitry for electric motors, which may provide traction and/or regeneration (e.g., braking). FIGS. 2-4 depict timing diagrams indicating the interplay and dependencies between signals within inverter system circuitries. FIG. 5 shows a flow chart of a method in which a first gate driver and a second gate driver are asserted in an alternating manner, while FIG. 6 shows a flow chart of a method of modulating electric-motor braking in which assertions of a first gate driver and a second gate driver to a power switch circuitry are toggled, thus toggling between an ASC process, which may be more suitable for use at a first range of speeds (e.g., relatively high speeds), and a freewheeling process, which may be more suitable for use at a second range of speeds (e.g., relatively low speeds).

In the following figures, the use of reference numerals and/or names that are similar in multiple figures may indicate that the elements to which the reference numerals and/or names refer are substantially similar.

FIG. 1A shows a block diagram of portions of an inverter system circuitry 100 for electric motors associated with one phase, including portions of an inverter circuitry and a MASC circuitry. Circuitry 100 may be incorporated into any of a variety of vehicles, including automotive vehicles (such as cars, trucks, and motorcycles). A vehicle into which circuitry 100 is incorporated may include one or more electric motors, each of which may in turn be coupled to one or more wheels of the vehicle. The one or more electric motors may supply torque to the various wheels of the vehicle.

In a scenario in which an inverter or electric motor is faulty, circuitry 100 may help reduce unwanted braking that may be created if an ASC process is performed at relatively low speeds, or if a freewheeling process is performed at relatively high speeds. Circuitry 100 may switch between the two processes, and may thereby create an average unwanted torque that is less than a torque of an inappropriately-applied application of an ASC process, and is less than a torque of an inappropriately-applied application of a freewheeling process.

Circuitry 100 may have an MCU 110, a first gate driver 120, a second gate driver 140, and a power switch circuitry 150. (First gate driver 120 may be one of either a high gate driver or a low gate driver, and second gate driver 140 may be the other of the high gate driver and the low gate driver.) MCU 110 may receive indicators from a variety of sensors related to the performance of one or more electric motors. The indicators may originate from various sensors and/or actuators associated with the vehicle, one or more motors of the vehicle, one or more wheels of the vehicle, and/or other portions of the vehicle (e.g., other portions associated with the vehicle's drivetrain). MCU 110 may subsequently generate and/or assert various indicators (for control and/or information-passing purposes) to the one or more motors, the one or more wheels, and/or other portions of the vehicle.

The various indicators asserted by MCU 110 may include a first MCU output 112 and a second MCU output 114. First MCU output 112 may correspond with an input to first gate driver 120, and second MCU output 114 may correspond with an input to second gate driver 140. In turn, first gate driver 120 may drive a first driver indicator 122 to a first input of power switch circuitry 150, while second gate driver 140 may drive a second driver indicator 144 to a second input of power switch circuitry 150.

In various embodiments, first MCU output 112 may be an MCU Pulse Width Modulation (PWM) high indicator, first gate driver 120 may be a high gate driver, and first driver indicator 122 may be a gate-driver PWM high indicator. Similarly, second MCU output 114 may be an MCU PWM low indicator, second gate driver 140 may be a low gate driver, and second driver indicator 144 may be a gate-driver PWM low indicator. In various embodiments, first MCU output 112, second MCU output 114, first gate driver 120, second gate driver 140, first driver indicator 122, second driver indicator 144, and power switch circuitry 150 may correspond with one of a plurality of circuitries. In various embodiments, each of these elements may in turn correspond with one phase of a multi-phase inverter circuitry, e.g., a three-phase pulse-width modulated inverter circuitry (such as discussed further below with respect to FIG. 1B).

Circuitry 100 may also have a MASC generation circuitry 160 (which may be a first MASC circuitry of circuitry 100) and a MASC selection circuitry 170 (which may be a second MASC circuitry of circuitry 100). MASC generation circuitry 160 may generate and/or assert a MASC signal 162. A MASC activation signal 180 may also be provided as an input to MASC selection circuitry 170.

In various embodiments, first MCU output 112, second MCU output 114, and MASC signal 162 may be provided as inputs to MASC selection circuitry 170. In turn, MASC selection circuitry 170 may have a first MASC output 172 and a second MASC output 174. First MASC output 172 may be an input to first gate driver 120, and second MASC output 174 may be an input to second gate driver 140.

When MASC activation signal 180 is de-asserted, circuitry 100 may be in a first mode of operation (e.g., a normal mode of operation), and when MASC activation signal 180 is asserted, circuitry 100 may be in a second mode of operation (e.g., a MASC mode of operation). MASC activation signal 180 may indicate an inverter degradation event (such as a microcontroller fault, a circuitry fault, a loss of auxiliary voltage such as auxiliary battery voltage, and so on). In some embodiments, the inverter degradation event may be an auxiliary battery degradation, or an inverter module degradation. For some embodiments, the inverter degradation event may be generated by a diagnostic monitor. MASC activation signal 180 may indicate loss of microcontroller functionality from any of a variety of causes (e.g., software, hardware, loss of power supply, and so forth).

In the first mode of operation (e.g., a normal-operation or standard-operation mode), MASC selection circuitry 170 may pass first MCU output 112 to first MASC output 172, and may pass second MCU output 114 to second MASC output 174. First gate driver 120 may then pass first MASC output 172 to the first input of power switch circuitry 150, and second gate driver 140 may pass second MASC output 174 to the second input of power switch circuitry 150. Accordingly, in the first mode of operation, first MCU output 112 and second MCU output 114 may ultimately establish the assertion of the first input of power switch circuitry 150 and the second input of power switch circuitry 150, respectively.

In comparison, in the second mode of operation (e.g., a MASC mode), MASC selection circuitry 170 may pass MASC signal 162 to one of first MASC output 172 and second MASC output 174, and may de-assert the other of first MASC output 172 and second MASC output 174. First gate driver 120 may then pass first MASC output 172 to the first input of power switch circuitry 150, and second gate driver 140 may pass second MASC output 174 to the second input of power switch circuitry 150. Accordingly, in the second mode of operation, MASC signal 162 may ultimately establish the assertion of one of the first input of power switch circuitry 150 and the second input of power switch circuitry 150, while the other of the first input of power switch circuitry 150 and the second input of power switch circuitry 150 is de-asserted.

In the second mode, for portions of the duty cycle of MASC signal 162 in which MASC signal 162 establishes the assertion of one of the first input of power switch circuitry 150 and the second input of power switch circuitry 150, power switch circuitry 150 may engage in an ASC process. In contrast, for portions of the duty cycle of MASC signal 162 in which both the first input of power switch circuitry 150 and the second input of power switch circuitry 150 are de-asserted, power switch circuitry 150 may engage in a freewheeling process. (For purposes of this disclosure, a duty cycle may be a fraction or percentage of time that a signal exists in a particular possible state, e.g., a fraction or percentage of time that a signal exists in an asserted state.)

Accordingly, following an inverter degradation event, MASC activation signal 180 may be asserted to MASC selection circuitry 170, which may then place MASC selection circuitry 170 into the second mode of operation (e.g., a MASC mode). As a result, MASC selection circuitry 170 may effectively disconnect the gate drivers (both high and low) from the outputs of MCU 110, and may instead connect the gate drivers (both high and low) to the output of MASC generation circuitry 160. Once the inverter degradation event has been handled, or the underlying degradation condition has otherwise passed, MASC activation signal 180 may be de-asserted to MASC selection circuitry 170, which may then return MASC selection circuitry 170 to the first mode of operation.

MASC selection circuitry 170 may thus comprise a selection circuitry that enters the second mode of operation (e.g., a MASC mode) upon an assertion of MASC activation signal 180, which may indicate an inverter degradation event; and that enters (or re-enters) the first mode of operation (e.g., a normal-operation or standard-operation mode) upon a de-assertion of MASC activation signal 180, which may indicate the resolution or ending of an inverter degradation event.

In some embodiments, MASC activation signal 180 may be asserted and/or de-asserted by being presented at a constant, predetermined voltage or signaling level, e.g., an active-high or active-low level. For some embodiments, MASC activation signal 180 may be asserted and/or de-asserted by being pulsed in a predetermined manner, e.g., to a predetermined active-high or active-low level, and/or for a predetermined period of time. In some embodiments, MASC activation signal 180 may be asserted and/or de-asserted by a protocol-based plurality of bits communicated (e.g., to MASC selection circuitry 170) either serially and/or in parallel.

First MCU output 112 and second MCU output 114 may have a time-varying duty cycle, which may vary in a substantially sinusoidal manner. Accordingly, in the first mode of operation, first driver indicator 122 and second driver indicator 144 may have a time-varying duty cycle substantially similar to the duty cycles of first MCU output 112 and second MCU output 114, respectively.

In comparison, MASC signal 162 may alternate between being asserted and being de-asserted at a predetermined frequency and/or with a predetermined duty cycle, as discussed herein. Accordingly, in the second mode of operation, one of first driver indicator 122 and second driver indicator 144 may alternate between being asserted and being de-asserted, while the other of first driver indicator 122 and second driver indicator 144 is de-asserted. In various embodiments, MASC signal 162 may alternate in a pattern, such as a pattern that recurs at a regular interval. For example, in some embodiments, MASC signal 162 may alternate at a substantially regular frequency. Similarly, in some embodiments, MASC signal 162 may alternate with a substantially uniform duty cycle.

For example, in some embodiments, MASC signal 162 may alternate at a predetermined frequency of between 0.5 kHz and 2.0 kHz and a predetermined duty cycle of between 35% and 65%; and or more narrowly between 0.75 kilohertz and 1.5 kHz; for example, the predetermined frequency may be approximately 1.0 kHz. For some embodiments, MASC signal 162 may alternate with a predetermined duty cycle of between 35% and 65%, or more narrowly between 40% and 60%; for example, the predetermined duty cycle may be approximately 50%.

In various embodiments, the predetermined frequency and the predetermined duty cycle may correspond with a weighted-averaging of a braking torque corresponding with an ASC process and a braking torque corresponding with a freewheeling process. Accordingly, the predetermined frequency and the predetermined duty cycle may correspond with a predetermined braking torque.

FIG. 1B shows a block diagram of portions of an inverter system circuitry 190 for electric motors associated with multiple phases, including portions of an inverter circuitry and a Modulated Active Short Circuit (MASC) circuitry. Portions of circuitry 190 may be substantially similar to portions of circuitry 100. However, whereas circuitry 100 has first gate driver 120, second gate driver 140, first driver indicator 122, second driver indicator 144, power switch circuitry 150, first MCU output 112, second MCU output 114, first MASC output 172, and second MASC output 174, circuitry 190 has substantially similar elements for a first phase (or leg) of an inverter system, and also has substantially similar elements for other phases (or legs) of the inverter system. Accordingly, the mechanisms and methods disclosed herein may be applicable to inverter systems with any number of phases (e.g., 1-phase inverter systems, 3-phase inverter systems, 5-phase inverter systems, 6-phase inverter systems, and so on).

FIGS. 2-4 show timing diagrams of the operation of an inverter system circuitry for electric motors. Turning to FIG. 2, a timeline 200 depicts a normal mode of operation. Timeline 200 shows relative states of a first MCU output (PWM_HIGH), a second MCU output (PWM_LOW), a MASC signal 262 (MASC), a first MASC output 272 (PH_HIGH), a second MASC output 274 (PH_LOW), a first driver indicator 222 to a first input of a power switch circuitry (GATE_HIGH), a second driver indicator 244 to a second input of a power switch circuitry (GATE_LOW), and a MASC activation signal 280.

MASC signal 262 is alternating at a predetermined frequency (of x kHz) and a predetermined duty cycle (of y percent). However, in timeline 200, MASC activation signal 280 is de-asserted, corresponding with the first mode of operation (e.g., a normal-operation or standard-operation mode). In this first mode, the values of the first MCU output and the second MCU output determine the values of first MASC output 272 and second MASC output 274, respectively. In turn, the values of first MASC output 272 and second MASC output 274 determine the values of first driver indicator 222 and second driver indicator 244, respectively. Accordingly, first MASC output 272 and first driver indicator 222, as well as second MASC output 274 and second driver indicator 444, may have time-varying duty cycles corresponding with the first MCU output and the second MCU output.

Turning now to FIG. 3, a timeline 300 depicts a first instance of a MASC mode of operation. Timeline 300 shows relative states of a first MCU output 312 (PWM_HIGH), a second MCU output 314 (PWM_LOW), a MASC signal 362 (MASC), a first MASC output 372 (PH_HIGH), a second MASC output 374 (PH_LOW), a first driver indicator 322 to a first input of a power switch circuitry (GATE_HIGH), a second driver indicator 344 to a second input of power switch circuitry (GATE_LOW), and a MASC activation signal 380.

In an early portion of timing diagram 300, MASC activation signal 380 is de-asserted, which may correspond with the first mode of operation. In comparison with timeline 200, in timeline 300, while in the first mode of operation, MASC activation signal 380 is asserted, indicating an inverter degradation event (e.g., due to an auxiliary battery degradation, an inverter module degradation, or another degradation mechanism), which may correspond with a second mode of operation (e.g., a MASC mode).

Following the assertion of MASC activation signal 380, the value of first MASC output 372 (e.g., asserted or de-asserted) is initially determined by the value of MASC signal 362 at a time $t_{01}$ following the assertion of MASC activation signal 380. Subsequently, the value of first MASC output 372 follows the values of MASC signal 362 at a time $t_{01}$ following the corresponding toggling of MASC signal 362.

In turn, the value of first driver indicator 322 is determined by the value of first MASC output 372 at a time $t_{12}$ following time $t_{01}$, after the assertion of MASC activation signal 380. Subsequently, the value of first driver indicator 322 follows the values of first MASC output 372 at a time $t_{12}$ following the corresponding toggling of first MASC output 372.

In contrast, following the assertion of MASC activation signal 380, the value of second MASC output 374 is initially de-asserted as of a time $t_{01}$ following the assertion of MASC activation signal 380, and remains de-asserted. In turn, the value of second driver indicator 344 is initially de-asserted as of a time $t_{12}$ following the de-assertion of second MASC output 374.

In the second mode, for portions of the duty cycle of MASC signal 362 in which MASC signal 162 establishes the assertion of first driver indicator 322 and the de-assertion of second driver indicator 344, the power switch circuitry may engage in an ASC process. In contrast, for portions of the duty cycle of MASC signal 362 in which both first driver indicator 322 and second driver indicator 344 are de-asserted, the power switch circuitry may engage in a freewheeling process.

Turning to FIG. 4, a timeline 400 depicts a second instance of a MASC mode of operation. Timeline 400 shows relative states of a first MCU output 412 (PWM_HIGH), a second MCU output 414 (PWM_LOW), a MASC signal 462 (MASC), a first MASC output 472 (PH_HIGH), a second MASC output 474 (PH_LOW), a first driver indicator 422 to a first input of a power switch circuitry (GATE_HIGH), a second driver indicator 444 to a second input of a power switch circuitry (GATE_LOW), and a MASC activation signal 480.

In an early portion of timing diagram 400, MASC activation signal 480 is de-asserted, which may correspond with a first mode of operation (e.g., a normal-operation or standard-operation mode). In comparison with timeline 200, in timeline 400, while in the first mode of operation, MASC activation signal 480 is asserted, indicating an inverter degradation event (e.g., due to an auxiliary battery degradation, an inverter module degradation, or another degradation mechanism), which may correspond with a second mode of operation (e.g., a MASC mode).

Following the assertion of MASC activation signal 480, the value of second MASC output 474 is initially determined (e.g., asserted or de-asserted) by the value of MASC signal 462 at a time $t_{01}$ following the assertion of MASC activation signal 480. Subsequently, the value of second MASC output 474 follows the values of MASC signal 462 at a time $t_{01}$ following the corresponding toggling of MASC signal 462.

In turn, the value of second driver indicator 444 is determined by the value of second MASC output 474 at a time $t_{12}$ following time $t_{01}$, after the assertion of MASC activation signal 480. Subsequently, the value of second driver indicator 444 follows the values of second MASC output 474 at a time $t_{12}$ following the corresponding toggling of second MASC output 474.

In contrast, following the assertion of MASC activation signal 480, the value of first MASC output 472 is initially de-asserted as of a time $t_{01}$ following the assertion of MASC activation signal 480, and remains de-asserted. In turn, the value of first driver indicator 422 is initially de-asserted as of a time $t_{12}$ following the de-assertion of first MASC output 472.

In the second mode, for portions of the duty cycle of MASC signal 462 in which MASC signal 162 establishes the assertion of second driver indicator 444 and the de-assertion of first driver indicator 422, the power switch circuitry may engage in an ASC process. In contrast, for portions of the duty cycle of MASC signal 462 in which both second driver indicator 444 and first driver indicator 422 are de-asserted, the power switch circuitry may engage in a freewheeling process.

Regarding FIGS. 3 and 4, in the first instance of the MASC mode of timeline 300, the first input to the power switch circuitry (via first driver indicator 322) is asserted and de-asserted in an alternating manner, following the values of MASC signal 362, while the second input to the power switch circuitry (via second driver indicator 344) is de-asserted. In comparison, in the second instance of the MASC mode of timeline 400, the second input to the power switch circuitry (via second driver indicator 444) is asserted and de-asserted in an alternating manner, following the values of MASC signal 462, while the first input to the power switch circuitry (via first driver indicator 424) is de-asserted. Although the input that is being alternatingly asserted to the power switch circuitry is different between timeline 300 and timeline 400, both instances of the MASC mode result in alternating between an ASC process and a freewheeling process.

FIG. 5 shows a flow chart of a method 500 for asserting a first gate driver and a second gate driver. In various embodiments, method 500 may comprise a first part 510, as second part 520, a third part 530, and a fourth part 540. In some embodiments, method 500 may comprise a fifth part 550 and/or a sixth part 560.

In first part 510, a MASC activation indicator may be received. The MASC activation indicator may indicate an inverter degradation event as discussed herein, for example by a circuitry similar to inverter circuitry 100. The indicator may be similar to MASC activation signal 180.

In second part 520, a first gate driver output may be provided to a power switch circuitry based upon a first gate driver indicator, and in third part 530, a second gate driver output may be provided to the power switch circuitry based upon a second gate driver indicator. The first gate driver output may be similar to first driver indicator 122, the second gate driver output may be similar to second driver indicator 144, and the power switch circuitry may be similar to power switch circuitry 150.

In fourth part 540, upon an assertion of the MASC activation indicator, one of the first gate driver indicator and the second gate driver indicator may be asserted in an alternating manner at a predetermined frequency and a predetermined duty cycle, and the other of the first gate driver indicator and the second gate driver indicator may be de-asserted in a constant manner. The first gate driver indicator may be similar to input to first gate driver 120, and the second gate driver indicator may be similar to the input to second gate driver 140.

In some embodiments, the power switch may be an insulated gate bipolar transistor (IGBT). For some embodiments, the predetermined frequency may be between 0.5 kHz and 2.0 kHz, or more narrowly between 0.75 kilohertz and 1.5 kHz; for example, the predetermined frequency may be approximately 1.0 kHz. In some embodiments, the predetermined duty cycle may be between 35% and 65%, or more narrowly between 40% and 60%; for example, the predetermined duty cycle may be approximately 50%.

For some embodiments, the predetermined frequency and/or the predetermined duty cycle may correspond with a predetermined braking torque. In some embodiments, the predetermined braking torque may be a weighted average of a first torque associated with an active short circuit process and a second torque associated with a freewheeling process.

In some embodiments, the MASC activation indicator (and/or the inverter degradation event) may be based upon at an auxiliary battery degradation and/or an inverter module degradation. For some embodiments, the inverter degradation event may be generated by a diagnostic monitor (and/or the inverter degradation event). In some embodiments, the MASC activation indicator (and/or the inverter degradation event) may be generated when measurements of a speed of the electric motor are not reliable. However, in various embodiments, the MASC activation indicator (and/or the inverter degradation event) may be generated when a processor is not functional. The methods and mechanisms disclosed herein may permit mitigation of an undesired excessive braking torque, which may in turn result in an acceptable average torque. This may be an advantageous solution given cost constraints for safety and reliability.

In various embodiments, in fifth part 550, an active short circuit process may be performed using the power switch circuitry when the one of the first gate driver indicator and the second gate driver is asserted while the other of the first gate driver indicator and the second gate driver indicator is de-asserted. Similarly, in various embodiments, in sixth part 560, a freewheeling process may be performed using the power switch circuitry when both the first gate driver indicator and the second gate driver are de-asserted.

FIG. 6 shows a flow chart of a method 600 of modulating electric-motor braking. In various embodiments, method 600 may comprise a first part 610, a second part 620, a third part 630, and a fourth part 640. In first part 610, a degradation event for an inverter may be detected based upon at least one of: an auxiliary battery degradation, and an inverter module degradation. In some embodiments, the auxiliary battery degradation may be detected by a sensor (e.g., a voltage sensor or monitor) associated with an auxiliary battery. For some embodiments, the auxiliary battery degradation may be a condition signaled by an auxiliary battery to one or more other parts of a vehicle, such as to an MCU. Similarly, in some embodiments, the inverter module degradation may be detected by a sensor (e.g., a sensor monitoring one or more voltages of the inverter module), or may be a condition signaled by an inverter module to one or more other parts of a vehicles, such as to an MCU.

In second part 620, an assertion and a de-assertion one of a first gate driver and a second gate driver to a power switch circuitry may be toggled, while a de-asserting the other of the first gate driver and the second gate driver to the power switch circuitry, based on the detection of the degradation event for the inverter.

In third part 630, an active short circuit process may be performed using the power switch circuitry when asserting the one of the first gate driver or the second gate driver while de-asserting the other of the first gate driver and the second gate driver, and in fourth part 640, a freewheeling process may be performed using the power switch circuitry when de-asserting both the first gate driver and the second gate driver.

In some embodiments, the toggling of the assertion and the de-assertion of the one of the first gate driver and the second gate driver may have a predetermined frequency of between 0.5 kHz and 2.0 kHz, or more narrowly between 0.75 kilohertz and 1.5 kHz; for example, the predetermined frequency may be approximately 1.0 kHz. For some embodiments, the toggling of the assertion and the de-assertion of the one of the first gate driver and the second gate driver may have a predetermined frequency of between 0.1 kHz and 10 kHz. In some embodiments, the toggling of the assertion and the de-assertion of the one of the first gate driver and the second gate driver may have a predetermined duty cycle of between 35% and 65%, or more narrowly between 40% and 60%; for example, the predetermined duty cycle may be approximately 50%. For some embodiments, the toggling of the assertion and the de-assertion of the one of the first gate driver and the second gate driver may have a predetermined duty cycle of between 10% and 90%.

In some embodiments, one or both of the predetermined frequency and the predetermined duty cycle may be tuned to produce a predetermined braking torque. For some embodiments, the predetermined braking torque may be a weighted average of a first torque associated with an active short circuit process and a second torque associated with a freewheeling process.

For some embodiments, the toggling of the assertion and the de-assertion of the one of the first gate driver and the second gate driver may occur when measurements of a speed of the electric motor are not reliable. In some embodiments, the toggling of the assertion and the de-assertion of the one of the first gate driver and the second gate driver may occur upon a degradation event generated by a diagnostic monitor.

In various embodiments, instructions for carrying out the methods disclosed herein (such as method 500 and/or method 600) may be executed by a controller, based on instructions stored on a memory of the controller, and in conjunction with signals received from sensors of the electrical motor and/or vehicle.

The methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

Thus provided herein are systems and methods for electric-motor braking when an engine fault has occurred. In a first approach to the methods and systems discussed herein, a first example of a method comprises: receiving an MASC activation indicator; providing a first gate driver output to a power switch circuitry based upon a first gate driver indicator; providing a second gate driver output to the power switch circuitry based upon a second gate driver indicator; and upon an assertion of the MASC activation indicator, asserting one of the first gate driver indicator and the second gate driver indicator in an alternating manner at a predetermined frequency and a predetermined duty cycle, and de-asserting the other of the first gate driver indicator and the second gate driver indicator. In a second example building off of the first example, the power switch is an IGBT. In a third example building off of either the first example or the second example, the predetermined frequency is between 0.5 kHz and 2.0 kHz. In other examples building off of either the first example or the second example, the predetermined frequency is between 0.1 kHz and 10 kHz. In a fourth example building off of any of the first example through the third example, the predetermined duty cycle is between 35% and 65%. In other examples building off of any of the first example through the third example, the predetermined duty cycle is between 10% and 90%. In a fifth example building off of any of the first example through the fourth example, the predetermined frequency is approximately 1.0 kHz; and the predetermined duty cycle is approximately 50%. In a sixth example building off of any of the first example through the fifth example, the predetermined frequency and the predetermined duty cycle correspond with a predetermined braking torque. In a seventh example building off of any of the first example through the sixth example, the MASC activation indicator is based upon at least one of: an auxiliary battery degradation, and an inverter module degradation. In an eighth example building off of any of the first example through the seventh example, the MASC activation indicator is generated by a diagnostic monitor. In a ninth example building off of any of the first example through the eighth example, the MASC activation indicator is generated when measurements of a speed of the electric motor are not reliable. In a tenth example building off of any of the first example through the ninth example, the method comprises: performing an active short circuit process using the power switch circuitry when the one of the first gate driver indicator and the second gate driver is asserted while the other of the first gate driver indicator and the second gate driver indicator is de-asserted; and performing a freewheeling process using the power switch circuitry when both the first gate driver indicator and the second gate driver are de-asserted.

In a second approach to the methods and systems discussed herein, a first example of a method of modulating electric-motor braking comprises: detecting a degradation event for an inverter based upon at least one of: an auxiliary battery degradation, and an inverter module degradation; toggling between asserting and de-asserting one of a first gate driver and a second gate driver to a power switch circuitry, while de-asserting the other of the first gate driver and the second gate driver to the power switch circuitry, based on the detection of the degradation event for the inverter; performing an active short circuit process using the power switch circuitry when asserting the one of the first gate driver or the second gate driver while de-asserting the other of the first gate driver and the second gate driver; and performing a freewheeling process using the power switch circuitry when de-asserting both the first gate driver and the second gate driver, wherein the toggling of the assertion and the de-assertion of the one of the first gate driver and the second gate driver has a predetermined frequency and a predetermined duty cycle. In a second example building off of the first example, the toggling of the assertion of the one of the first gate driver and the second gate driver has a predetermined frequency of between 0.75 kHz and 1.5 kHz; and the toggling of the assertion of the one of the first gate driver and the second gate driver has a predetermined duty cycle of between 40% and 60%. In other examples building off of the first example, the toggling of the assertion of the one of the first gate driver and the second gate driver has a predetermined frequency of between 0.1 kHz and 10 kHz. In still further examples building off of the first example, the toggling of the assertion of the one of the first gate driver and the second gate driver has a predetermined duty cycle of between 10% and 90%. In a third example building off of the second example, the predetermined frequency is approximately 1.0 kHz; and the predetermined duty cycle is approximately 50%. In a fourth example building off of either the second example or the third example, one or both of the predetermined frequency and the predetermined duty cycle are tuned to produce a predetermined braking torque. In a fifth example building off of the fourth example, the predetermined braking torque is a weighted average of a first torque associated with an active short circuit process and a second torque associated with a freewheeling process. In a sixth example building off of any of the first example through the fifth example, the toggling of the assertion of the one of the first gate driver and the second gate driver occurs when measurements of a speed of the electric motor are not reliable.

In a third approach to the methods and systems discussed herein, a first example of an inverter system for electric motors comprises: an MCU circuitry having a first output and a second output; a power switch circuitry having a first input and a second input; and a selection circuitry operable, in a first mode, to pass the first output of the MCU circuitry to the first input and to pass the second output of the MCU circuitry to the second input, and operable, in a second mode, to pass a first indicator to the first input and to pass a second indicator to the second input, wherein the selection circuitry enters the second mode upon indication of an inverter degradation event; and wherein an assertion of one of the first indicator and the second indicator alternates at a predetermined frequency and a predetermined duty cycle, while the other of the first indicator and the second indicator is de-asserted. In a second example building off of the first example, the assertion of the one of the first indicator and the second indicator alternates at a predetermined frequency of between 0.5 kHz and 2.0 kHz and a predetermined duty cycle of between 35% and 65%; and the predetermined frequency and the predetermined duty cycle correspond with a predetermined braking torque. In a third example building off of either the first example or the second example, the inverter degradation event is one of an auxiliary battery degradation or an inverter module degradation; and the electric-motor degradation event is generated by a diagnostic monitor. In a fourth example building off of any of the first example through the third example, the power switch circuitry initiates an active short circuit process upon the one of the first indicator and the second indicator being asserted while the other of the first indicator and the second indicator is de-asserted; and the power switch circuitry initiates a freewheeling process when both the first indicator and the second indicator are de-asserted.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems for electric motors and vehicles described above with respect to FIGS. 1A-6. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. Terms such as "first," "second," "third," and so on are used merely as labels, and are not intended to impose numerical requirements or a particular positional order on their objects. The following claims particularly point out subject matter from the above disclosure that is regarded as novel and non-obvious.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments. Also, terminology in which elements are presented in a list using "and/or" language means any combination of the listed elements. For example, "A, B, and/or C" may mean any of the following: A alone; B alone; C alone; A and B; A and C; B and C; or A, B, and C.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
receiving a Modulated Active Short Circuit (MASC) activation indicator;
providing a first gate driver output to a power switch circuitry based upon a first gate driver indicator;
providing a second gate driver output to the power switch circuitry based upon a second gate driver indicator; and
upon an assertion of the MASC activation indicator, and until a de-assertion of the MASC activation indicator, asserting one of the first gate driver indicator and the second gate driver indicator in an alternating manner at a predetermined frequency and a predetermined duty cycle, and de-asserting the other of the first gate driver indicator and the second gate driver indicator,
wherein the predetermined duty cycle is a fraction of time that the one of the first gate driver indicator and the second gate driver indicator exists in an asserted state.

2. The method of claim 1,
wherein the power switch is an insulated gate bipolar transistor (IGBT).

3. The method of claim 2,
wherein the predetermined frequency is between 0.5 kilohertz (kHz) and 2.0 kHz.

4. The method of claim 2,
wherein the predetermined duty cycle is between 35% and 65%.

5. The method of claim 2,
wherein the predetermined frequency is approximately 1.0 kHz; and
wherein the predetermined duty cycle is approximately 50%.

6. The method of claim 2,
wherein the predetermined frequency and the predetermined duty cycle correspond with a predetermined braking torque.

7. The method of claim 1,
wherein the MASC activation indicator is based upon at least one of: an auxiliary battery degradation, and an inverter module degradation.

8. The method of claim 1,
wherein the MASC activation indicator is generated by a diagnostic monitor.

9. The method of claim 1,
wherein the MASC activation indicator is generated when the processor is not functional.

10. The method of claim 1, comprising:
performing an active short circuit process using the power switch circuitry when either the first gate driver indicator is asserted while the second gate driver indicator is de-asserted, or when the second gate driver indicator is asserted while the first gate driver indicator is de-asserted; and
performing a freewheeling process using the power switch circuitry when both the first gate driver indicator and the second gate driver are de-asserted.

11. A method of modulating electric-motor braking, the method comprising:
detecting a degradation event for an inverter based upon at least one of: an auxiliary battery degradation, and an inverter module degradation;
asserting a Modulated Active Short Circuit (MASC) activation indicator based on the detection of the degradation event for the inverter; and
while the MASC activation signal is asserted,
toggling between asserting and de-asserting one of a first gate driver and a second gate driver to a power switch circuitry, while de-asserting the other of the first gate driver and the second gate driver to the power switch circuitry,
performing an active short circuit process using the power switch circuitry when asserting the one of the first gate driver or the second gate driver while de-asserting the other of the first gate driver and the second gate driver, and
performing a freewheeling process using the power switch circuitry when de-asserting both the first gate driver and the second gate driver,
wherein the toggling of the assertion and the de-assertion of the one of the first gate driver and the second gate driver has a substantially regular predetermined frequency and a substantially uniform predetermined duty cycle.

12. The method of claim 11,
wherein the toggling of the assertion of the one of the first gate driver and the second gate driver has a predetermined frequency of between 0.75 kilohertz (kHz) and 1.5 kHz; and
wherein the toggling of the assertion of the one of the first gate driver and the second gate driver has a predetermined duty cycle of between 40% and 60%.

13. The method of claim 12,
wherein the predetermined frequency is approximately 1.0 kHz; and
wherein the predetermined duty cycle is approximately 50%.

14. The method of claim 12,
wherein one or both of the predetermined frequency and the predetermined duty cycle are tuned to produce a predetermined braking torque.

15. The method of claim 14,
wherein the predetermined braking torque is a weighted average of a first torque associated with an active short circuit process and a second torque associated with a freewheeling process.

16. The method of claim 11,
wherein the toggling of the assertion of the one of the first gate driver and the second gate driver occurs when measurements of a speed of the electric motor are not reliable.

17. An inverter system for electric motors, comprising:
a motor control unit (MCU) circuitry having a first output and a second output;
a power switch circuitry having a first input and a second input; and
a selection circuitry operable, in a first mode, to pass the first output of the MCU circuitry to the first input and to pass the second output of the MCU circuitry to the second input, and operable, in a second mode, to pass a first indicator to the first input and to pass a second indicator to the second input,
wherein the selection circuitry enters the second mode upon indication of an inverter degradation event; and
wherein an assertion of one of the first indicator and the second indicator alternates at a single predetermined frequency and a single predetermined duty cycle, while the other of the first indicator and the second indicator is de-asserted.

18. The inverter system for electric motors of claim 17,
wherein the assertion of the one of the first indicator and the second indicator alternates at a predetermined frequency of between 0.5 kilohertz (kHz) and 2.0 kHz and a predetermined duty cycle of between 35% and 65%; and
wherein the predetermined frequency and the predetermined duty cycle correspond with a predetermined braking torque.

19. The inverter system for electric motors of claim 17,
wherein the inverter degradation event is one of an auxiliary battery degradation or an inverter module degradation; and
wherein the inverter degradation event is generated by a diagnostic monitor.

20. The inverter system for electric motors of claim 17,
wherein the power switch circuitry initiates an active short circuit process upon the one of the first indicator and the second indicator being asserted while the other of the first indicator and the second indicator is de-asserted; and
wherein the power switch circuitry initiates a freewheeling process when both the first indicator and the second indicator are de-asserted.

* * * * *